United States Patent [19]

Loiselle

[11] 4,225,893
[45] Sep. 30, 1980

[54] CLEANER FOR A PLAYING HEAD OF A CASSETTE PLAYER

[76] Inventor: Guy J. Loiselle, 8648 Terrace Dr., Delta, British Columbia, Canada

[21] Appl. No.: 8,626

[22] Filed: Feb. 1, 1979

Related U.S. Application Data

[63] Continuation-in-part of Ser. No. 811,813, Jun. 30, 1977, Pat. No. 4,149,206.

[51] Int. Cl.² ............................................. G11B 5/41
[52] U.S. Cl. ............................... 360/128; 15/210 R; 274/47; 360/137
[58] Field of Search ..................... 360/128, 132, 137; 274/47; 15/210 R

[56] References Cited

U.S. PATENT DOCUMENTS

| | | | |
|---|---|---|---|
| 3,439,222 | 4/1969 | Howard | 274/47 |
| 3,647,990 | 3/1972 | Eul, Jr. et al. | 360/128 |
| 3,655,924 | 4/1972 | Puskas | 360/128 |
| 3,761,994 | 10/1973 | Becht | 360/128 |
| 3,881,195 | 4/1975 | Ono | 360/128 |
| 3,955,214 | 5/1976 | Post et al. | 360/128 |

Primary Examiner—Alfred H. Eddleman

[57] ABSTRACT

A cleaner for a playing head of a cassette player having a sprocket drive and having a recess able to receive a cassette tape in a playing position. The cleaner comprises a hollow container dimensioned to be retainable within the recess. A hollow post is within the container, positioned to permit the sprocket drive of the player to enter the interior of the container. A cam is positioned on the post and is rotatable thereon. Drive means on the cam engage the sprocket drive of the tape player. There is an opening in one side of the container. A lever is pivotally located within the container to be reciprocable by the cam. The lever has a pin for continuously engaging a circular groove on the cam. Means at one end of the lever receives cleaning means for the playing head of the tape player. The cleaning means is able to project from the opening in the container to contact and clean the playing head when the cleaner is retained within the recess. Means for cleaning a capstan and a pinch roller of the cassette player comprises a felt cleaning pad secured to the housing at one end and a leaf spring having one end secured to the housing.

13 Claims, 12 Drawing Figures

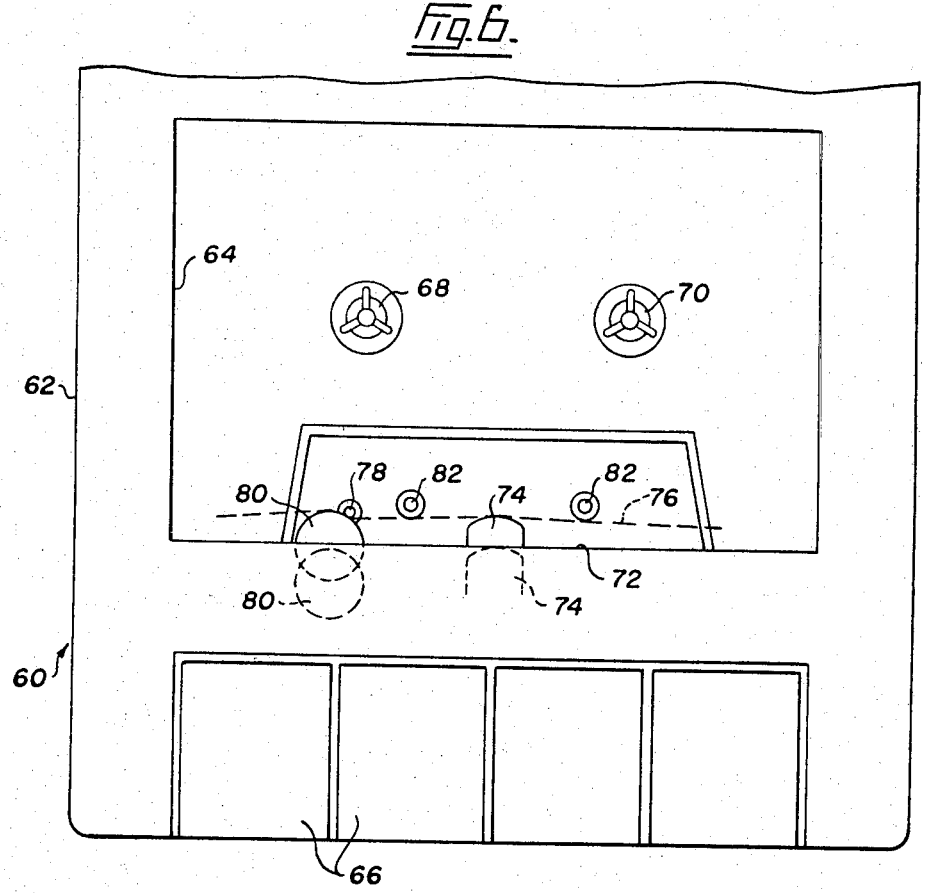
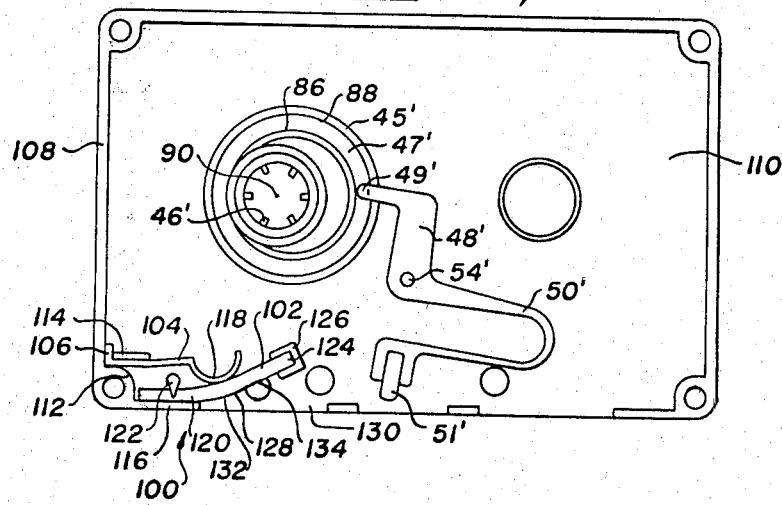

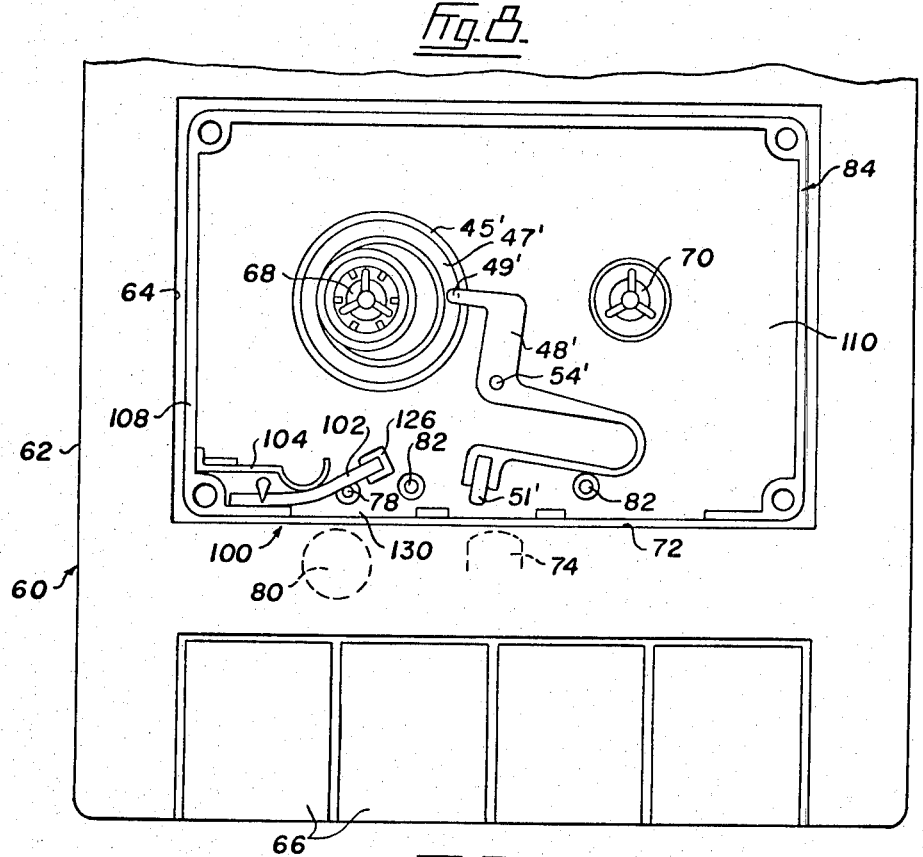
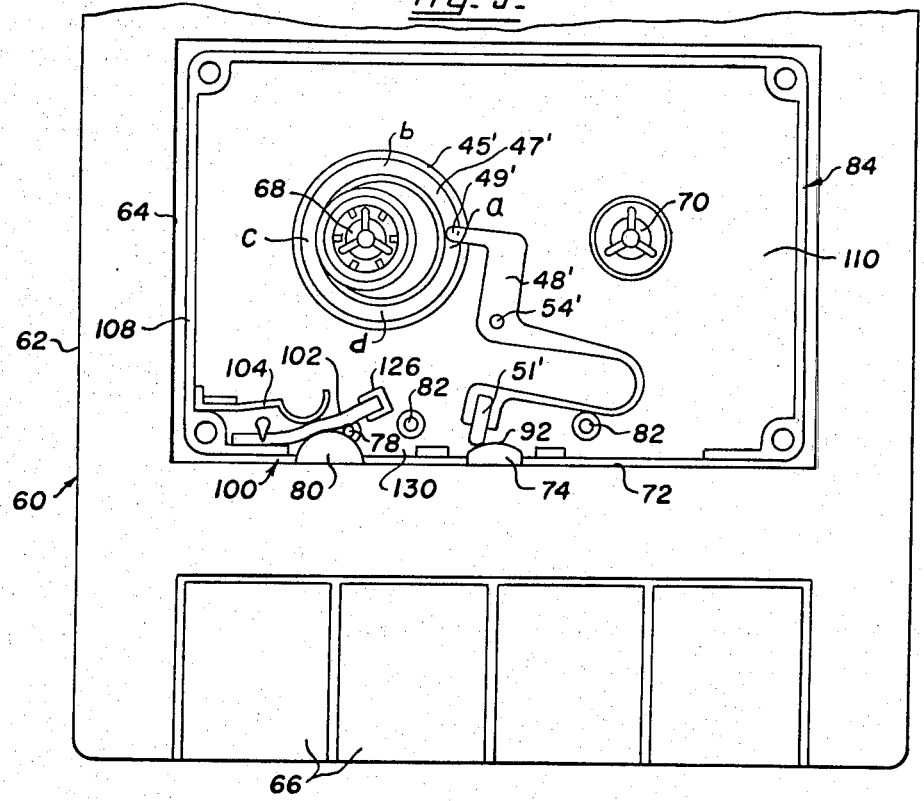

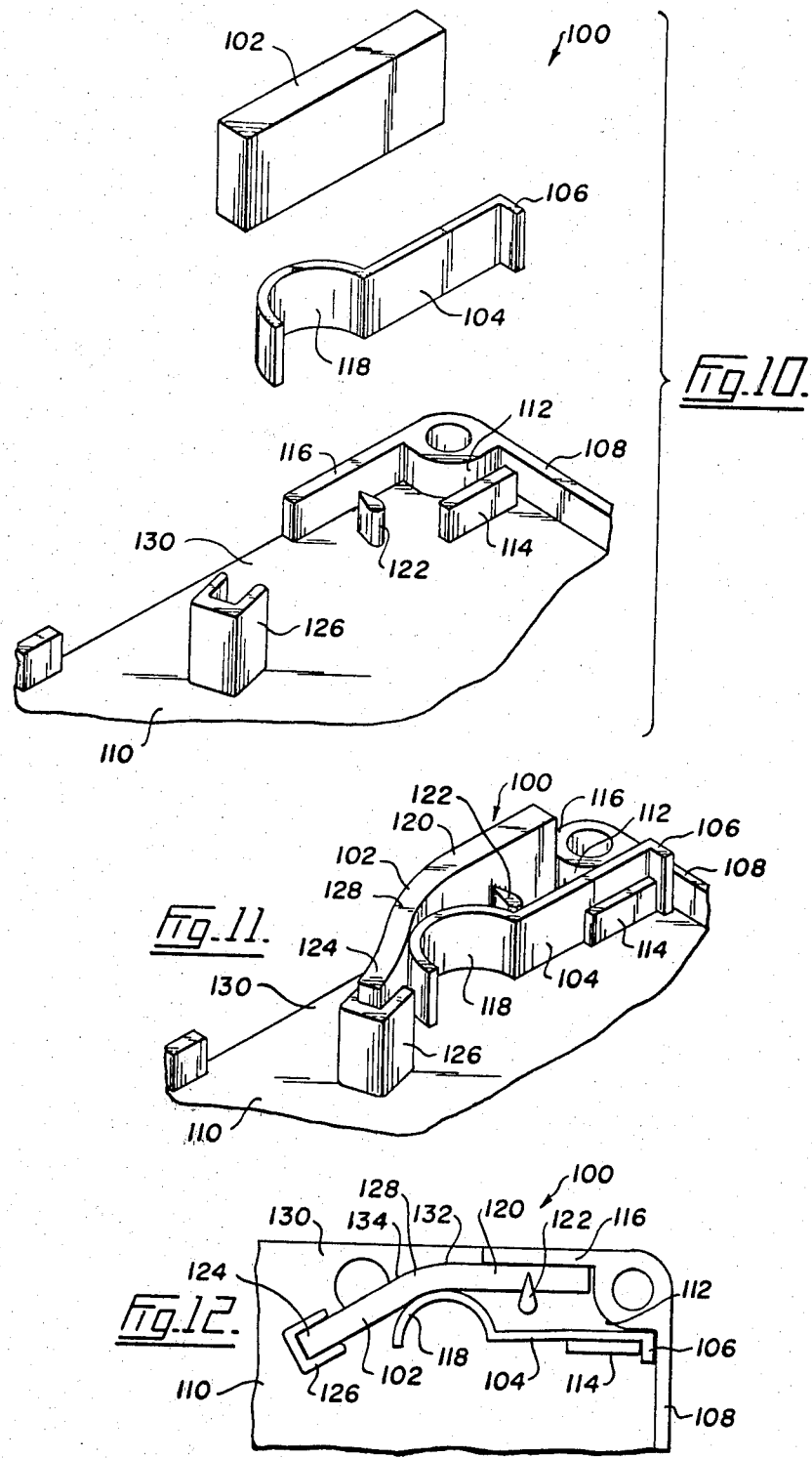

CLEANER FOR A PLAYING HEAD OF A CASSETTE PLAYER

This is a continuation-in-part of U.S. Patent application Ser. No. 811,813 filed June 30, 1977, now U.S. Pat. No. 4,149,206.

BACKGROUND OF THE INVENTION

This invention relates to a cleaner for a playing head of a cassette player.

Cassette tapes having a sprocket drive are becoming increasingly popular in tape playing machines. Increasingly they are replacing those cartridges in which the tape is driven by a capstan that, in turn, is driven by an electric motor. In a cartridge machine the tape is pinched between the capstan of the tape player and a pinch wheel in the cartridge. Rotation of the capstan by an electric motor drives the tape across a playing head to play the recorded sound. However, cassette players that have a sprocket drive have two reels and the magnetic tape is passed between the reels across a playing head. Drive in such a machine is by a sprocket in the cassette player engaging in teeth in the interior of the tape receiving reels. The sprockets turn, engage the teeth of the reels and thus force the tape across the tape playing head.

In many of the tape playing devices, cartridge or cassette, the cleaning of the tape heads can be a problem. This is particularly so in those tape players used in automobiles. Normally the tape playing head is positioned at the bottom of a recess that receives and retains the cassette or cartridge tape in a playing position. The cassette or cartridge is typically provided with means to retain itself within the recess. However, the location of the tape playing head at the base of the recess makes the cleaning difficult. Yet for continued use it is essential that the tape playing head be kept clean.

There have been proposals to clean the playing head of tape players. Generally speaking, they rely on a hand operated lever extending through a cartridge. At one end of the lever there is a cleaning pad that contacts the tape playing head. At the other end of the lever, which extends through the back of the cartridge and out of the recess, there is a handle so that the cleaning pad can be reciprocated across the tape playing head. However, this can be undesirable. In particular, if a playing head performs badly in an automobile there is a temptation for the driver to clean the head while the car is moving, which is dangerous.

The present invention avoids the disadvantages of the prior art and, in particular, provides an automatic cleaner of the playing head of a cassette player. It is merely necessary to insert the cleaner of the present invention into the recess of the cassette player for the cleaner to clean the playing head of the cassette player. The cleaner may be left in position for a few minutes and then removed. After this, the playing head of the cassette player is adequately cleaned.

SUMMARY OF THE INVENTION

Accordingly, in one aspect, the present invention is a cleaner for a playing head of a cassette player having a sprocket drive and having a recess able to receive a cassette tape in a playing position, the cleaner comprising a hollow container dimensioned to be retainable within the recess; a hollow post within the container, positioned to permit the sprocket drive of the player to enter the interior of the container; a cam positioned on said post and rotatable thereon; drive means on said cam to engage the sprocket drive of the tape player; an opening in one side of the container; a lever pivotally located within the container to be reciprocable by the cam; means at one end of the lever to receive cleaning means for the cleaning head of the tape player, the cleaning means being able to project from the opening in the container to contact and clean the playing head when the cleaner is retained within the recess; and means for continuously engaging the lever and the cam.

In a preferred form, the means for continuously engaging the lever and the cam comprises: a groove on the cam defining a closed path and means on the lever for following the groove. For example, the means for following the groove comprises a pin on the lever.

Preferably, the cam is generally circular and eccentrically displaced with respect to the hollow post and the groove is a generally circular peripheral groove on the cam.

In drawings which illustrate embodiments of the invention;

FIG. 6 is a plan view of a third embodiment of the invention installed in a cassette player;

FIG. 7 is a plan view of the third embodiment of the invention with the top half of the container removed;

FIGS. 8 and 9 are top plan views of the third embodiment installed in a cassette player with the top half of the container removed;

FIG. 10 is an exploded view of the cleaning assembly of the third embodiment of the capstan and pinch roller;

FIG. 11 is a perspective view of the third embodiment showing a portion of the cleaner and the cleaning assembly of FIG. 10; and FIG. 12 is a top plan view of the portion of the cleaner shown in FIG. 11.

DESCRIPTION OF THE PREFERRED EMBODIMENTS

Referring to drawings 1 to 3, they illustrate a cleaner 2 for a playing head of a tape player. The tape player has a sprocket drive 4 formed with teeth 6. Only the sprocket drive, the capstan, and the playing head of the tape player are shown. The sprocket drive of the player is formed within a recess that is able to receive a cassette tape in a playing position.

Figure 1:
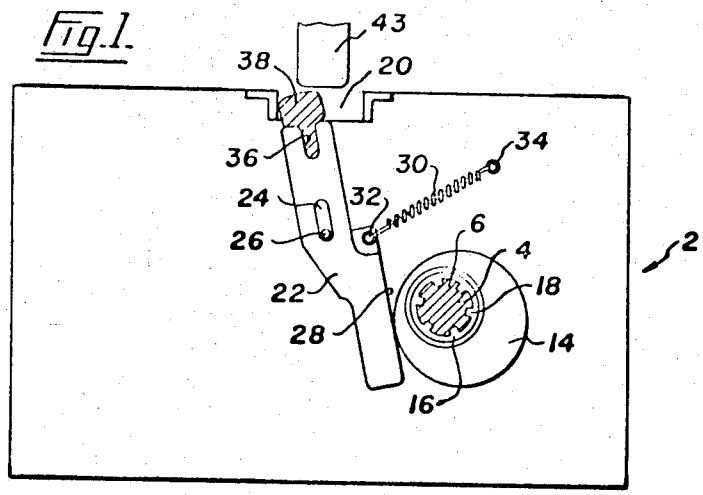
FIG. 1 is a plan view showing a first embodiment of the present invention.
Figure 2:
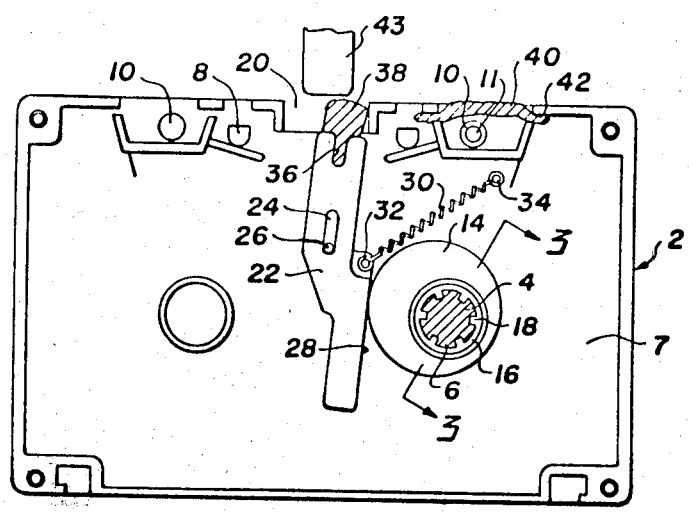
FIG. 2 is a more detailed view, similar to FIG. 1, showing the first embodiment of the present invention.

The cleaner comprises a hollow container 7—only half of which is shown in FIGS. 1 and 2—that is dimensioned to be retainable within the recess of the tape player. To this end, the cleaner of the present invention may, insofar as retention within the recess is necessary, be an exact duplicate of a cassette tape. FIG. 2 illustrates that the cleaner is formed with holes 8 to receive retaining pins formed in the tape player recess and with holes 10 to receive the capstan of the tape player. FIG. 2 illustrates a capstan drive 11 in position in one of the holes 10.

Figure 3:
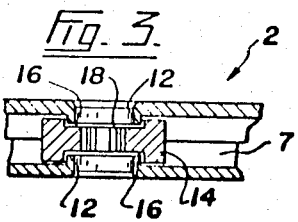
FIG. 3 is a partial section along the line 3—3 of FIG. 2 but with the top of the container also shown.

The container 7 is formed with a hollow post 12 as indicated most clearly in FIG. 3 where the top and bottom parts of the post 12 are shown. Such a post 12 is conventional in a tape player having a sprocket drive. Normally it receives the reel. As shown in FIG. 3 the post is made up of two projections, one on the bottom of the container and the other on the top that meet in the middle to form hollow post 12. In the illustrated embodiment, the hollow post on the left of, for example, FIG. 2 is not necessary for the cleaning action but at least an opening is necessary in order to permit the cleaner 2 to be positioned within the recess since the recess is provided with two sprocket drives 4 so that the tape may be moved backward or forward within the cassette.

As indicated on the right of FIGS. 1 and 2 the sprocket drive 4 projects through the hollow post 12 into the interior of the container 7. There is a cam 14 positioned on the hollow post 12 and rotatable on the hollow post 12. The cam is made rotatable by the provision of a recess 16 dimensioned to be a fairly loose fit over the hollow post 12. The cam 14 is formed with internal teeth 18 which comprise a drive means on the cam 14. Teeth 18 engage the teeth 6 on the sprocket drive 4 of the tape player so that the cam 14 may be rotated by the sprocket drive 4 of the tape player.

There is an opening 20 formed in one side of the container 7. A lever 22 is pivotally located within the container 7. The lever 22 is provided with a slot 24 that engages on a post 26 formed in the container 7. A surface 28 of the lever 22 abuts the cam 14. Surface 28 is urged into position by a coil spring 30 stretched between a first post 32 formed on the lever 22 and a second post 34 formed within the container 7. Coil spring 30 thus continually urges the surface 28 on lever 22 into contact with the cam 14. It also urges the lever 22 outwardly of the opening 20.

As indicated in FIGS. 1 and 2 the lever 22 is formed with a recess 36 at one end. Recess 36 holds an absorbent pad 38 that can be soaked with fluid to clean the playing head of the tape player. To do this, the cleaning means projects from the opening 20 in the front of the container 7. Opening 20 is aligned with the playing head 43 of the cassette player. Pad 38 is urged outwardly by coil spring 30 against the playing head 43 of the cassette player.

In the embodiment illustrated in FIG. 2 the container is also provided with a second pad 40 that is retained in recesses 42 formed in the container 7. The second pad 40 is pressed against the capstan of the cassette player.

In operation, the cleaner according to the present invention is simply pressed into the recess of a cassette player. This action operates the conventional microswitches on the player so that the sprocket drive 4 of the cassette player is caused to rotate. Pressing the container 7 into the recess automatically aligns the teeth 18 on cam 14 with teeth 6 on the sprocket driver 4. Thus, the cam 14 is rotated. Rotation of the cam 14 causes reciprocation of the lever 22 about the post 26 so that the pad 38 is moved back and forth across the playing head 43 of the cassette player. After a few minutes the cleaner may be removed just like a conventional cassette tape and the playing head is clean.

The container 7 of the cleaner 2 of the present invention may be made of the usual plastics from which cassettes are made. The lever 22 and the cam 14 may be made of any suitable plastics material, for example, nylon. As indicated above the container 7 may, in fact, be a conventional cassette but in that case it is usually necessary to modify the openings of the cassette to form the wider openings 20 required by the cleaner of the present invention.

Figure 4:
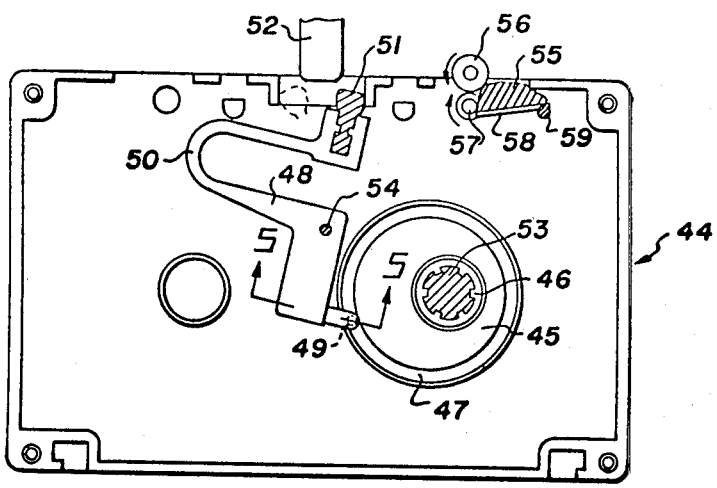
FIG. 4 is a plan view showing a second embodiment of the present invention.
Figure 5:
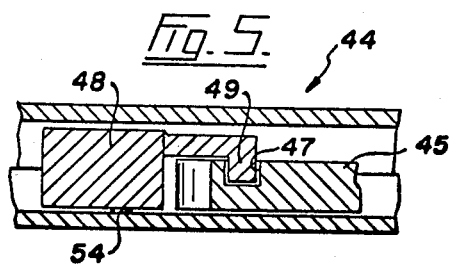
FIG. 5 is a partial section along the line 5—5 of FIG. 3 showing only one end of the lever and a portion of the cam.

FIGS. 4 and 5 illustrate a second embodiment of the invention. Cleaner 44 is generally similar in construction and operation to cleaner 2 and will be discussed in sufficient detail only to bring out the differences between the two embodiments. There is a cam 45 with internal teeth 46 which comprise the drive means on the cam 45. The circular cam 45 has a peripheral groove 47. Lever 48 has a pin 49 and, as may best be seen in FIG. 5, the pin 49 of the lever 48 engages the groove 47 of the cam 45. The lever 48 has an integral loop 50 comprising means for resiliently biasing the pad 51 against the playing head 52. The loop 50 permits a limited deformation of lever 48 as pad 51 contacts playing head 52. In operation, as cam 45 is rotated by the sprocket drive 53 of the cassette player, pin 49 follows groove 47 of cam 45. This causes lever 48 to reciprocate back and forth about pin 54 and pad 51 to move back and forth against playing head 52.

Felt pad 55 is provided in cleaner 44 for cleaning pinch roller 56 and capstan 57. Nylon spring 58 is attached to cleaner 44 at pin 59 and applies continuous pressure against pad 55 for cleaning pinch roller 56 and capstan 57. There is no tendency for pad 55 to be drawn between capstan 57 and pinch roller 56 because of the opposing direction of rotation of both.

As may be seen, cleaners 2 and 44 provide for continuous back and forth movements of pads 38 and 51 respectively across playing heads 43 and 52 respectively.

FIGS. 7 through 12 show a third embodiment of the present invention, and FIG. 6 illustrates a typical cassette player 60 which is shown herein to demonstrate more clearly the cleaning functions of this third embodiment.

With reference to FIG. 6 the cassette player 60 comprises a housing 62 which defines a recess 64 to receive the cleaner. A plurality of operating members 66 are provided on one side of the player and are operated to cause the player 60 to perform its various operations. A pair of spindles are located in the recess 64, namely a drive spindle 68 and a rewind spindle 70.

In describing the various components of the player 60, the term "forward" will denote proximity to that side of the player 60 having the operating members 66, the term "rearward" denotes proximity to the opposite side of the player 60; the term "left" refers to that portion of the player 60 positioned on the left side of the drawing representing FIG. 6; the term "right" refers to the opposite side; and finally the center line of the player 60 will be considered as that line extending through the middle of the player 60 from the front to the rear. These same terms will be used in describing the cassette player cleaner as it is positioned in the recess 64.

Centrally located in the player 60 at the forward wall 72 of the recess 64 is a playing head 74. (It is to be understood that the term "playing head" is intended to be used broadly enough so that it will also refer to a head which could perform a recording function instead of or in addition to, the playing function.) This head 74 has a retracted position, shown in broken lines in FIG. 6, and a second playing position, shown in full lines in FIG. 6, where it is moved forwardly from its retracted position and is able to engage a tape (indicated schematically at 76) which is wound on a cassette which is placed in the recess 64.

Located proximate to the forward wall 72, moderately to the left of the playing head 74 are a capstan 78 and a pinch roller 80. The pinch roller 80 has a retracted position (also shown in broken lines in FIG. 6) where it is just forward of the forward wall 72, and a playing position where it has moved rearwardly to extend a short distance rearwardly beyond the wall 72 and press the tape 76 against the capstan 78. In their operating positions, the capstan 78 and the pinch roller 80 frictionally engage the tape 76 and move in counter rotating relationship to move the tape 76 to the left (as seen in FIG. 6). The components of FIG. 6 are drawn approximately to scale, and it can be seen that the pinch roller 80 has a diameter substantially larger than that of the capstan 78. Also, the capstan is offset laterally from the center of rotation of the pinch roller 80 to a moderate extent toward the center of the player 60. Thus, with the capstan 78 and pinch roller 80 engaging the tape 76, the tape 76 is caused to bend moderately around a small portion of the circumference of the pinch roller 80. Also, a pair of alignment pins 82 are provided at locations adjacent to, and on opposite sides of, the playing head 74.

With reference to FIGS. 7 through 12, the third embodiment generally designated 84, will now be described. Those components of the third embodiment 84 which are similar to components of the second embodiment will be given like numerical designations, with a prime (') designation distinguishing those of the third embodiment. Thus, there is a cam 45' with internal teeth 46' and a peripheral groove 47'. There is also a lever 48' having a laterally extending finger on the end of which is a downwardly extending pin 49' which engages the groove 47'. The forward portion of the lever 48' has a integral loop 50' to resiliently bias a pad 51' which is mounted on the forward end of the lever 48'. The pad 51' is so positioned that it bears against the playing head 74 in cleaning engagement. As described with reference to the second embodiment, as the cam 45' is rotated by the drive spindle 68, the pin 49' of the lever 48' follows the groove 47' of the cam 45'. This causes the lever 48' to reciprocate back and forth about a pivot pin 54' which is located at approximately the mid-length of the longitudinal axis of the lever 48'.

From the description in the preceding paragraph, it can be seen that the components 45'-54' are substantially the same as in the second embodiment. To discuss some of the advantageous operating features of the cam mechanism of the second and third embodiments, it should be understood that in most cassette players, there is an automatic mechanism which causes the cassette player to either reverse or simply stop if there is a resisting force to drive mechanism above a predetermined magnitude. The reason for this is so that when the tape in the cassette player travels its full length through the player, the player should not continue to attempt to drive the tape further. One common form of these shut-off devices is a current sensing device operatively connected to the drive circuit of the cassette player. Thus, when the drive spindle 68 works against a load above a predetermined level, the resulting increase in drive current operates a cut-off switch which stops further rotation of the drive spindle 68. Thus, for the cleaner 84 to operate reliably, it is necessary that the cam 45' at no time provide a resisting force against the drive spindle 68 above a predetermined level. In this regard, it will be noted that the groove 47' of the cam 45' is defined by two concentric circular upstanding lips or walls, namely an inner circular wall 86 and an outer circular wall 88. The outer surface of the inner wall 86 and the inner surface of the outer wall 88 comprise the cam surface or surfaces which engage the pin 49' to reciprocate the lever 48'. It will be noted that the common center of the concentric walls 86 and 88 is offset moderately with respect to the center of rotation 90 of the cam 45'.

With regard to the manner in which the cam 45' imparts reciprocating motion to the lever 48', consideration will be given to four locations along the cam groove 47'. With reference to FIG. 9, these four locations are indicated at a, b, c and d. These four locations a to d are spaced ninety degrees apart from each other, with location a being at the point furthest from the center of rotation 90 to cam 45', and location c being diametrically opposed to location a and being nearest to the cam center of rotation 90. Locations b and d are diametrically opposed from one another, and spaced ninety degrees from locations a and c.

With further reference to FIG. 9, it can be seen that with the cam 45' being in a position where the cam follower or pin 49' is quite close to location a on the groove 47', the lever 48' has moved to its extreme position where the pad 51' is at the left of the playing head 74. As the cam 45' rotates further, it will begin to rotate the lever 48' so that the pad 51' moves to the right across the surface 92 of the head 74. It will be noted that the head surface 92 is curved moderately, so that the initial motion of the pad 51' is from its furthest left position then along surface 92 to a position in which pad 51 slants rearwardly relative to the longitudinal axis of the lever 48'. Also, it should be noted that for the pad 51' to perform its cleaning function properly, it should press with a moderate force against the head surface 92 to insure that there is adequate pressure at the surface of the pad 51'. Thus, in initially moving the pad 51' from its furthest left position, it is necessary to overcome the static friction existing between the pad 51' and the head surface 92. After the initial static friction is overcome, and the pad 51' has moved further along the head surface 92 to where it is travelling in a path which is almost totally lateral, with no forward or rearward travel component, the pad 51' is able to move across the head surface 92' without having to overcome static friction or move the pad 51 against the surface 92 on a slanted path which would oppose the motion of the pad 51'.

To turn our attention back to the configuration of the groove 47', it will be noted that when the cam 45' is in the position shown in FIG. 9 (i.e. with the cam follower pin 49' quite close to location a on the groove 47'), for a given increment of angular travel of the cam 45', there is a relatively small increment of lateral travel of the lever 48'. Thus, the cam 45' can be said to have a relatively high mechanical advantage in transmitting the torque from the drive spindle 68 to back and forth movement of the lever 48'.

After the cam has rotated approximately ninety degrees so that the cam following pin 49 engages the groove 47 at approximately location b, the groove 47' is slanting inwardly towards the center of rotation 80 at approximately its highest degree of slant, and the mechanical advantage between the torque exerted by the drive spindle 68 relative to the lateral movement imparted to the lever 48' is at a minimum. However, when the pin 49' is a location b of the groove 47, the cleaning pad 51' is moving across the center portion of the head surface 92 and has already overcome the static friction and is encountering only sliding friction as it moves across a portion of the head surface 92 which is more laterally aligned.

By the time the cam 45' has rotated so that the cam following pin 49' is engaging the groove 47' at location c, the lever 48' has reached its other end of travel, and the pad 51' is about to begin its return path across the head surface 92. In this condition, there also exists a situation where for a given increment of angular travel of the cam 45' there is very little lateral movement of the pin 49'. Thus, in this situation also the torque exerted by the drive spindle 68 has a relatively high mechanical advantage relative to the movement of the lever 48'. As stated previously, this better enables the pad 51' to overcome static friction and again begin moving back across the head surface 92.

It has been found that this particular arrangement of the cam groove 47' relative to the arrangement of the lever 48' and other components permits the pad 51' to engage the head surface 92 with sufficient pressure to accomplish proper cleaning action, but without creating a resisting force against rotation of the cam 45' at a level which would activate the shut-off mechanism of the player 60. It will further be noted that the cam following pin 49' is substantially in contact engagement with the cam surfaces provided by the inner and outer cam lips or walls 86 and 88 so that there is a relatively smooth transmission of force between the cam 45' and the lever 48'.

The cleaner 48 is provided with a second cleaning assembly 100 to clean both the capstan 78 and pinch roller 80. This cleaning assembly 100 comprises an elongate felt cleaning pad 102, which is urged by elongate leaf spring 104 toward its cleaning position.

The leaf spring 104 has an outer end with a right angle hook 106 which is held by three members, namely the right wall 108 of the cassette housing 110, and inwardly extending protruding portion 112 at the front left corner of the cassette housing 110 (this protruding portion 112 receiving a connecting screw which holds the two housing sections together) and a flat laterally extending locating member 114 positioned slightly to the right of the housing left wall 108 and a moderate distance rearwardly of the cassette housing front wall 116.

The left portion of the spring 104 extends from its hook portion 106 over the front surface of the locating member 114 and terminates at its right end in a forwardly extending curve 118. Thus, it can be seen that the spring 104 has a root end which is adjacent the hook 106 and is maintained in a stationary position by the wall 108, locating member 114 and front wall 116, and also a spring end at the location of the spring curved portion 118.

The felt cleaning pad 102 has a left end 120 positioned against the front wall 116 and abutting a stop member 122. The pad 102 has a right end 124 positioned in a recess of a U shaped retaining member 126 mounted to the housing 110.

The middle portion 128 of the pad 102 is positioned adjacent a front opening 130 in the cassette housing front wall 116. This front opening 130 is positioned adjacent the capstan 78 and pinch roller 80 when the cassette cleaner 84 is positioned in the recess 64 of the player 60. The curved portion 118 of the spring 104 pushes the middle portion 128 of the pad 102 forwardly.

Thus, the pad 102 extends from its left end 120 laterally, and its middle portion 128 is pressed by the spring 104 in a curve that extends moderately rearwardly to the pad right end 124 which is positioned in the retaining member 126.

The middle portion 128 of the pad 102 can be considered as being divided into two cleaning portions, namely a left portion 132 positioned and arranged to clean the pinch roller 80, and a right portion 134 positioned to clean the capstan 78. The left portion 132 is pushed by the right spring portion 118 forwardly toward the pinch roller 80. Since the spring portion 118 is able to deflect moderately rearwardly, when the pinch roller 118 is moved rearwardly into the front wall opening 130 towards its operating position, it will engage the left cleaning portion 132 of the pad 102 and push it rearwardly to a moderate extent. The degree of rearward movement of the left cleaning portion 132 will depend upon the particular construction and positioning of the pinch roller 80.

The right cleaning portion 134 is positioned closely adjacent to the retaining member 126, so that it is not deflected to any great extent by the action of the spring 104. The right cleaning portion 134 is located so that when the cleaner 84 is placed in the recess 64 of the player 60, the upwardly extending pointed end of the capstan 78 moves by the lower forward edge of the cleaning pad right portion 134, with the side surface of the capstan 78 being pressed against the forward surface of the right cleaning pad portion 134.

The spring 104 and left cleaning pad portion 132 are so located that the cleaning pad portion 132 would engage the pinch roller of most all commercially available cassette players, even those having a pinch roller 80 located more forwardly in the playing position. Thus, for the cassette players 60 having more forwardly positioned pinch roller 80 the spring 104 is able to maintain the cleaning pad portion 132 in adequate cleaning contact. For those cassette players having pinch rollers 80 at more rearward locations, the spring 104 is able to deflect rearwardly to permit the pinch roller 80 to move to its operating position, with contact between the pad 102 and the pinch roller 80 being maintained. Since the capstan 78 is positioned more closely to the retaining member 126, the further rearward movement of the left pad portion 132 does not move the right pad portion 134 out of the cleaning engagement with the capstan 78.

It is believed that the mode of operations of the third embodiment of the present invention is readily apparent from the foregoing description. However, to review this mode of operation briefly, the cleaning device is placed in the recess 64 of the cassette player 60, and one of the appropriate control members 66 is depressed to move the playing head 74 and the pinch roller 80 rearwardly to their operating positions. This places the playing head 74 in cleaning engagement with the pad 51' and also places the capstan 80 into cleaning engagement with the portion 132 of the second cleaning pad 102. The capstan 78 is in cleaning engagement with the pad portion 132 by virtue of its location next to the retaining member 126.

The surface 92 of the cleaning head 74 is cleaned by the reciprocating motion of the pad 51' against the surface 92'. The capstan 78 and pinch roller 80 rotate in a manner that the peripheral surfaces of these two members 78 and 80 rub against the cleaning pad 102. After an adequate period of time when the cleaning solution in the pads 51' and 102 have cleaned the contamination from their respective members, the cleaning device 84 is simply removed from the recess 64.

What I claim is:

1. A cleaner for a playing head of a cassette player having a sprocket drive and having a recess able to receive a cassette tape in a playing position, the cleaner comprising:
   a hollow container dimensioned to be retainable within the recess;
   a hollow post within the container, positioned to permit the sprocket drive of the player to enter the interior of the container;
   a generally circular cam positioned on the post and rotatable thereon;
   drive means on the cam to engage the sprocket drive of the cassette player;
   an opening in one side of the container;
   a lever pivotally located within the container to be reciprocable by the cam;
   means at one end of the lever to receive cleaning means for the playing head of the cassette player, the cleaning means being able to project from the opening in the container to contact and clean the playing head when the cleaner is retained within the recess;
   means for continuously engaging the lever and the cam comprising a generally circular peripheral groove on the cam and a pin on the lever for following the groove; and
   means for cleaning a capstan and a pinch roller of the cassette player comprising a felt cleaning pad secured to the housing at one end and a leaf spring having one end secured to the housing near one side thereof, the leaf spring having a forwardly curved portion near an end opposite the one end, the curved portion of the spring biasing a middle portion of the pad forwardly to bear against the capstan and pinch roller.

2. A cleaner as claimed in claim 1, the container having a front wall and two front corners, the means for cleaning the capstan and pinch roller being near one said corner, the one end of the leaf spring being secured to the container adjacent the one corner and extending generally parallel to the front wall.

3. A cleaner as claimed in claim 2, the felt pad being located adjacent an opening in the front wall and forwardly of the leaf spring.

4. A cleaner as claimed in claim 3, the one end of the felt pad being located inwardly of the container with respect to the opposite end of the leaf spring.

5. A cleaner as claimed in claim 4, the one end of the felt pad being secured by a U-shaped retainer mounted on the container.

6. A cleaner as claimed in claim 5, the one end of the leaf spring being hook-shaped.

7. A cleaner as claimed in claim 6, the one end of the leaf spring being secured between the one corner of the container and a locating member.

8. A cleaner as claimed in claim 7, the end of the felt pad opposite the one end being between the one corner of the container and the opening in the front wall.

9. A cleaner as claimed in claim 8, comprising a stop member connected to the container and abutting said opposite end of the felt pad.

10. A device for cleaning a capstan and pinch roller of a cassette player which has a recess able to receive a cassette tape in a playing position, said device comprising:
    a. a container adapted to be retainable within the recess;
    b. a first cleaning portion mounted in said container so that, with said container positioned in the recess, said first cleaning portion is located adjacent said capstan and in cleaning engagement with said capstan;
    c. a second cleaning portion mounted in said container so that, when said container is positioned in said recess, said second cleaning portion is located adjacent said pinch roller, said second cleaning portion being movably mounted for movement toward and away from said pinch roller; and
    d. spring means arranged to yieldingly urge said second cleaning portion towards said pinch roller and into cleaning engagement with the pinch roller, with said spring means yielding sufficiently to permit said cleaning portion to be positioned at various cleaning locations to accommodate variations in size and position of pinch rollers of various cassette players.

11. The cleaning device as recited in claim 10, wherein:
    a. said first and second cleaning portions comprise a pad having first and second ends;
    b. said device further comprises a first locating means engaging the first end of the pad at a first position, and a second locating member to engage the second end of the pad at a second position;
    c. said first cleaning portion comprises a first portion of said pad positioned more closely to said first retaining member, so that, with said second pad portion being located at different positions to accommodate pinch rollers of various sizes and positions, said first pad portion is able to be maintained in cleaning contact with said capstan; and
    d. said second cleaning portion comprises a second portion of said pad, which second pad portion is spaced a sufficient distance from said locating members to permit movement of second pad portion toward and away from said pinch roller.

12. The device as recited in claim 11, wherein said container has a bottom wall having a bottom opening to receive said capstan, said first pad portion extending at least partially over said bottom opening so that, when said container is placed in said recess, said capstan is moved upwardly through said bottom opening to press in cleaning engagement against said pad portion.

13. The device as recited in any of claim 11, 12 or 13, wherein said spring means comprises a leaf spring having a root end mounted at a stationary location in said container, and a spring end engaging said second pad portion to urge said second pad portion toward the capstan.

* * * * *